United States Patent [19]
Smith et al.

[11] Patent Number: 5,819,866
[45] Date of Patent: Oct. 13, 1998

[54] ACTIVE PITCH CONTROL FOR A MOBILE MACHINE

[75] Inventors: David P. Smith, Joliet; Ronnie L. Satzler, Princeville, both of Ill.

[73] Assignee: Caterpillar Inc., Peoria, Ill.

[21] Appl. No.: 709,315

[22] Filed: Sep. 9, 1996

[51] Int. Cl.$^6$ ................................................. B60K 17/356
[52] U.S. Cl. ............................ 180/197; 180/307; 701/84
[58] Field of Search .................................. 180/197, 305, 180/307, 308, 306; 701/82, 84, 85, 86

[56] References Cited

U.S. PATENT DOCUMENTS

| | | | |
|---|---|---|---|
| 3,886,915 | 6/1975 | Taplin | 123/102 |
| 3,999,386 | 12/1976 | Crull et al. | 60/423 |
| 4,837,694 | 6/1989 | Narita et al. | 701/70 |
| 5,474,147 | 12/1995 | Yesel et al. | 180/197 |

*Primary Examiner*—Kevin Hurley
*Attorney, Agent, or Firm*—John W. Grant; J. W. Burrows

[57] ABSTRACT

An active pitch control is provided for counteracting the pitching motion of a mobile machine. The machine has an apparatus for transmitting driving torque from an engine to a pair of pneumatic tires. The pitch control includes a device for detecting a pitching motion of the machine and responsively outputting a control signal. A device receives the control signal and changes the driving torque transmitted to the tires to counteract the pitching motion.

11 Claims, 2 Drawing Sheets

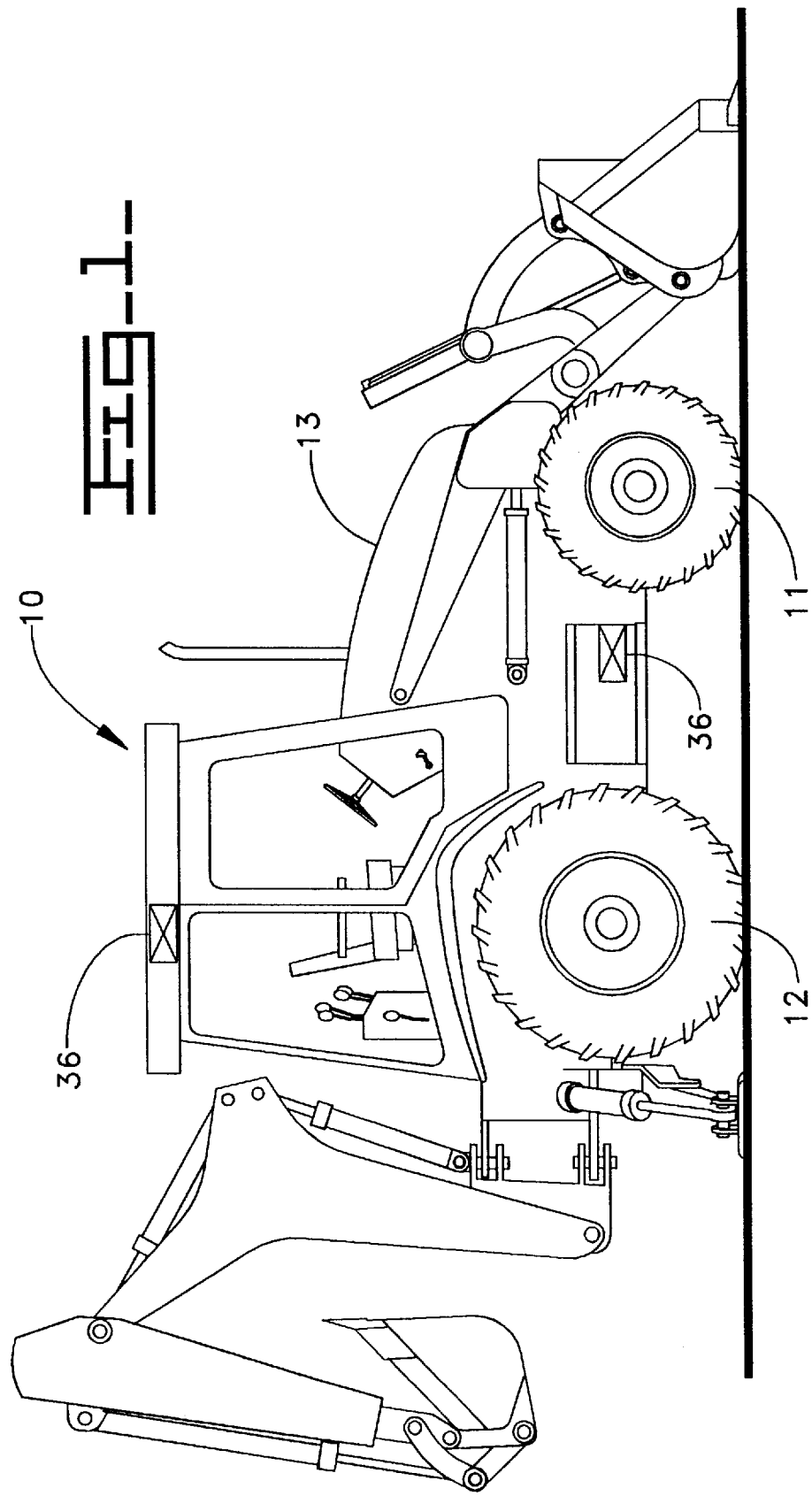

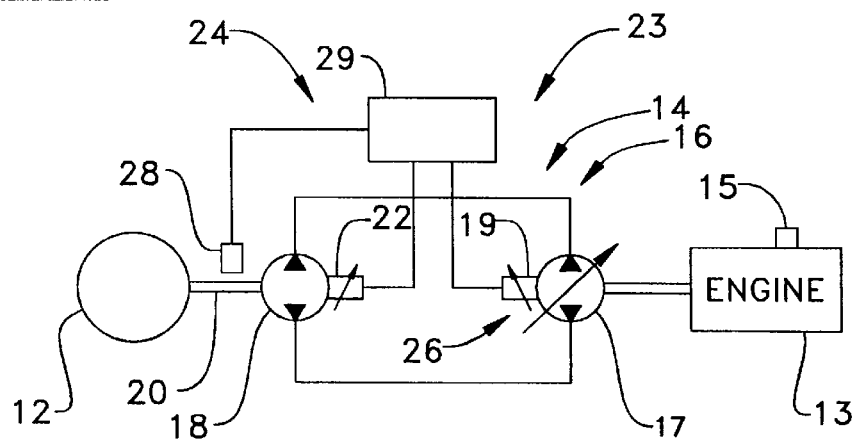
Fig_2_
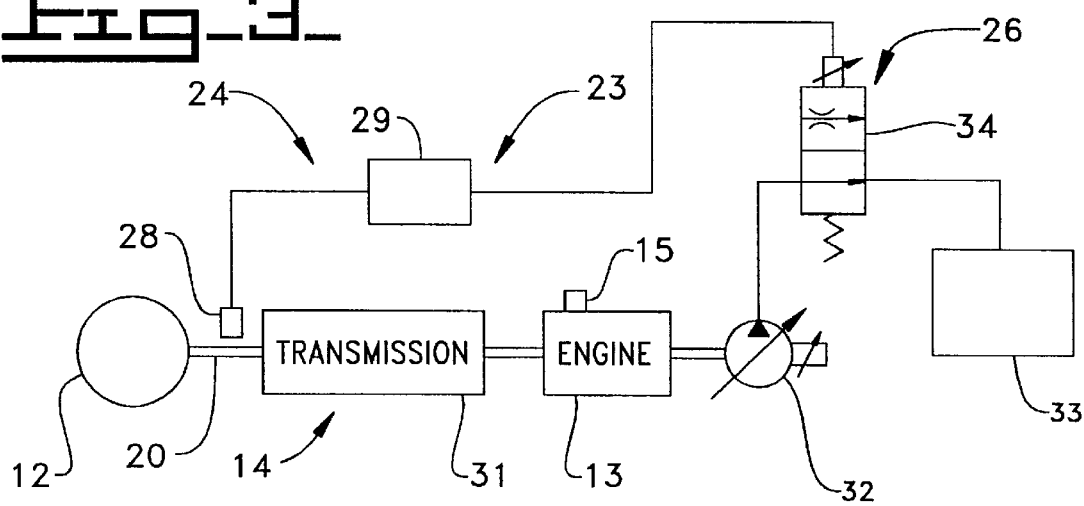
Fig_3_
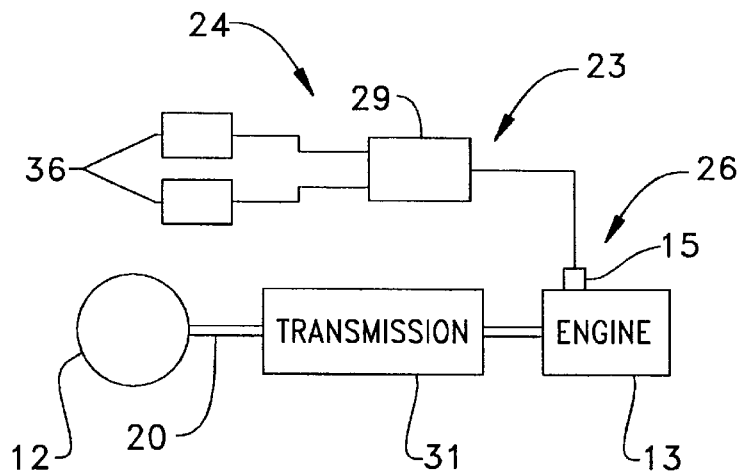
Fig_4_

ACTIVE PITCH CONTROL FOR A MOBILE MACHINE

TECHNICAL FIELD

This invention relates generally to a pitch control for a mobile machine and, more particularly, to an active pitch control in which the pitching motion is counteracted by changing the driving torque transmitted to the drive tires.

BACKGROUND ART

Mobile machines having pneumatic rubber tires can develop loping, i.e., fore and aft pitching, caused by energy alternately being input into and suddenly released from the tires. Typically, the tires of the machine are the only means of suspension and contribute to the loping effect. Loping is worse in machines having bias ply tires and is more prevalent in backhoe loaders due to a large moment of inertia about the pitch axis in conjunction with a relative short wheel base and to the cantilevered mass at its front and rear ends. The frequency of machine lope is a result of the machine's speed and the load being carried. A machine with an empty bucket traveling at normal roading speeds would encounter a high loping frequency as compared to one with a loaded bucket traveling at a slower speed. The loping can be quite severe especially when the machine speed is at resonance frequency of the tires and, in some cases, the front wheels may actually lose contact with the ground.

One attempt at dampening the machine loping included the introduction of an accumulator in the hydraulic lift circuit for the bucket. That arrangement is considered a passive dampener and has a shortcoming in that the accumulator can't be sized for both full and empty bucket conditions. Also, the accumulator has to be isolated during raising of the bucket or the raising action will be spongy.

Thus, it would be desirable to have an active pitch control for pneumatic rubber-tired mobile machines that reacts actively by changing the torque input to the tires to counteract the input of energy into or the release of energy from the tires for dampening machine loping under all roading conditions.

The present invention is directed to overcoming one or more of the problems as set forth above.

DISCLOSURE OF THE INVENTION

In one aspect of the present invention, an active pitch control for a mobile machine having an engine, a pair of pneumatic tires, and an apparatus for transmitting driving torque from the engine to the tires comprises a means for detecting a pitching motion of the machine and responsively outputting a control signal, and a means for receiving the control signal and for momentarily changing the driving torque transmitted to the tires upon receiving the control signal so that the pitching motion is counteracted.

BRIEF DESCRIPTION OF THE DRAWINGS

FIG. 1 is a diagrammatic illustration of a mobile machine incorporating an embodiment of the present invention; and FIGS. 2–4 are schematic illustrations of separate embodiments of the present invention.

BEST MODE FOR CARRYING OUT THE INVENTION

A mobile machine 10, such as a backhoe loader, includes a pair of pneumatic front tires 11 and a pair of larger pneumatic rear tires 12. The machine 10 includes an engine indicated at 13 in FIG. 2 and an apparatus 14 for transmitting driving torque from the engine to the rear tires 12. The engine has an electrically controlled fuel delivery system indicated at 15 for conventionally controlling the delivery of fuel to the combustion chambers, not shown.

In the FIG. 2 embodiment, the torque transmitting apparatus 14 includes a hydrostatic transmission 16 having a variable displacement hydraulic pump 17 hydraulically coupled to a variable displacement hydraulic motor 18. The hydraulic pump 17 is mechanically driven by the engine 13 and has a displacement controller 19 for varying the output displacement setting of the pump. In the preferred embodiment, the displacement controller includes an electrohydraulic proportional valve, not shown. The hydraulic motor mechanically drives the rear tires 12 through an output shaft 20. The hydraulic motor in this embodiment also includes a displacement controller 22 for varying the displacement setting.

The rotational speed of the output shaft 20 and thus the driving torque transmitted from the engine to the tires can be changed by changing the displacement of either the pump or the motor or a combination of both the hydraulic pump and the hydraulic motor.

Alternatively, the variable displacement hydraulic motor 18 can be replaced with a fixed displacement hydraulic motor wherein the rotational speed of the output shaft is then changed by changing the displacement of the hydraulic pump.

An active ride control 23 is provided in combination with the mobile machine 10 and includes a detecting means 24 for detecting a pitching motion of the machine and responsively outputting a control signal, and a means 26 for receiving the control signal and for momentarily changing the driving torque transmitted to the tires upon receiving the control signal so that the pitching motion is counteracted.

The receiving and changing means 26 includes one or both of the displacement controllers 19 or 22. The detecting means 24 includes a speed sensor 28 and a control means such as a microprocessor 29. The speed sensor 28 is disposed to sense the rotational speed of the output shaft 20 and responsively produces a shaft speed signal directed to the microprocessor 29 which determines the occurrence of instantaneous changes in the rotational speed of the output shaft and responsively outputs a control signal to one of the displacement controllers 19,22. Preferably the microprocessor 29 will be programmed to direct the control signal to the displacement controller 19 of the pump 17. Alternatively, the microprocessor can be programmed to direct the control signal to the displacement controller 22 of the motor 18 or to one or the other of the displacement controllers dependent upon the displacement settings of the pump and motor.

In the FIG. 3 embodiment, the torque transmitting apparatus 14 includes a conventional transmission 31 disposed between the engine 13 and the output shaft 20. Additionally, an implement pump 32 is connected to a hydraulic system 33 through an electrohydraulic proportional restrictor valve 34. In this embodiment, the receiving and changing means 26 includes the restrictor valve 34 which is disposed to receive the control signal from the microprocessor 29.

The detecting means 24 in the FIG. 4 embodiment includes an accelerometer 36 positioned on the machine (see FIG. 1) at a location sufficient to detect a pitching motion and responsively directing a pitch signal to the microprocessor 29. The receiving and changing means 26 includes the fuel delivery system 15 disposed to receive the control signal from the microprocessor 29.

Alternatively the speed sensor 28 of FIGS. 2 and 3 can be replaced with the accelerometer 36 as described in the preceding paragraph.

Industrial Applicability

In the use of all three embodiments, it is to be assumed that the machine is traveling at a relatively constant speed and any pitch motion is the result of an external influence such as when the machine encounters a bump or depression, thereby causing vertical raising or lowering of one end of the machine. The fore and aft pitching motion of a machine causes a change in the rolling radius of the tires sufficient for causing a change in the speed of the output shaft. This is more prevalent with machines having bias ply tires. Thus, the embodiments of FIGS. 2 and 3 utilizes this characteristic in detecting the occurrence of a fore or aft pitch by sensing the output speed and determining the speed of the output shaft changes.

With specific reference to FIG. 2, in use the microprocessor 29 receives the speed signal from the speed sensor 28 and is programmed to detect changes in the speed signal indicative of an change in the rotational speed of the output shaft. When a speed change occurs, the microprocessor determines whether the machine is pitching fore or aft and outputs an appropriate control signal. The microprocessor can be programmed to direct the control signal to one of the displacement controllers 19 or 22 dependant the direction of the pitching motion. For example, a forward pitch is counteracted by increasing torque to the tires and a rearward pitch is counteracted by decreasing torque to the tires.

More specifically, in one control scheme, the control signal is directed to the displacement controller 19 of the pump 18 to decrease the displacement of the pump for increasing the torque transmitted to the tires 12 during a forward pitch, and to increase the displacement of the pump for decreasing the torque transmitted to the tires during a rearward pitch. When the pump is already at maximum displacement, only forward pitching would be counteracted by decreasing pump displacement.

Alternatively in another control scheme, the microprocessor can be programmed to direct the control signal to the displacement controller 22 of the motor 18 to increase the displacement of the motor for increasing the torque transmitted to the tires 12 during a forward pitch, and to decrease the displacement of the motor for decreasing the torque transmitted to the tires during a rearward pitch. When the motor is already at minimum displacement, only rearward pitching would be counteracted by increasing motor displacement.

In the use of the FIG. 3 embodiment, the control signal is determined essentially as described above. However, in the FIG. 3 embodiment, a rearward pitch motion results in the control signal being directed to the restrictor 34 to restrict the output flow from the pump 32. This inherently momentarily increases the load on the engine resulting in less torque being transmitted from the engine through the output shaft to the tires 12.

In use of the FIG. 4 embodiment, fore and aft pitching of the machine is detected by the accelerometer 36 which outputs a signal to the microprocessor 29 when a pitch motion is detected. The microprocessor receives the signal from the accelerometer and is programmed to direct a control signal proportional to the rate of acceleration to the fuel control system 15 when the pitch signal exceeds a predetermined amplitude. If the microprocessor detects a forward pitching, the control signal to the fuel control system 15 momentarily increases the fuel delivery to the engine to increase the torque transmitted to the drive wheels. Conversely, if the microprocessor detects a rearward pitching motion, the control signal delivered to the fuel control system reduces the amount of fuel directed to the engine to thereby reduce the torque transmitted to the drive wheels.

Other aspects, objects and advantages of this invention can be obtained from a study of the drawings, the disclosure and the appended claims.

We claim:

1. An active pitch control for a mobile machine having an engine, a pair of pneumatic tires, and an apparatus having an output shaft drivingly connected to the tires for transmitting driving torque from the engine to the tires, the apparatus includes an output shaft drivingly connected to the tires, comprising:

means for detecting a pitching motion of the machine and responsively outputting a control signal, the detecting means including a speed sensor disposed to sense the rotational speed of the output shaft and to output a shaft speed signal, and control means for receiving the speed signal, determining changes in the speed signal, and outputting the control signal when a speed change occurs; and means for receiving the control signal and for changing the drive torque transmitted to the tires upon receiving the control signal so that the pitching motion is counteracted.

2. The active pitch control of claim 1 wherein the apparatus includes a hydrostatic transmission having a hydraulic pump driven by the engine and a hydraulic motor suitably drivingly coupled to the output shaft, the receiving and changing means including means for changing the displacement of one of the hydraulic pump or motor in response to receiving the control signal.

3. The active pitch control of claim 2 wherein the hydraulic pump is a variable displacement pump having an electrically controlled displacement controller and wherein the receiving and changing means includes the displacement controller.

4. The active pitch control of claim 2 wherein the hydraulic motor is a variable displacement motor having an electrically controlled displacement controller and wherein the receiving and changing means includes the displacement controller.

5. The active pitch control of claim 1 wherein the receiving and changing means includes a hydraulic pump drivingly connected to the engine and an electrohydraulic variable restrictor disposed to controllably restrict output flow of the pump upon receiving the control signal.

6. The active pitch control of claim 1 wherein the detecting means includes an accelerometer connected to the mobile machine and disposed to output a pitch signal indicative of forward and rearward pitching, and control means for receiving the pitch signal and determining a pitch signal and outputting the control signal when the pitch signal exceeds a predetermined amplitude.

7. The active pitch control of claim 6 wherein the receiving and changing means includes a fuel delivery system disposed to change fuel delivery to the engine upon receiving the control signal.

8. The active pitch control of claim 6 wherein the apparatus includes a hydrostatic transmission having a hydraulic pump driven by the engine and a hydraulic motor suitably drivingly coupled to the output shaft, the receiving and changing means including means for changing the displacement of one of the hydraulic pump or motor in response to receiving the control signal.

9. The active pitch control of claim 8 wherein the hydraulic pump is a variable displacement pump having an electrically controlled displacement controller and wherein the receiving and changing means includes the displacement controller.

10. The active pitch control of claim 8 wherein the hydraulic motor is a variable displacement motor having an electrically controlled displacement controller and wherein the receiving and changing means includes the displacement controller.

11. The active pitch control of claim 6 wherein the receiving and changing means includes a hydraulic pump drivingly connected to the engine and an electrohydraulic variable restrictor disposed to controllably restrict output flow of the pump upon receiving the control signal.

\* \* \* \* \*